May 18, 1954  A. T. HOLDEN ET AL  2,678,633

WRITING INSTRUMENT

Filed Jan. 25, 1952

INVENTORS
ALFRED T. HOLDEN
GEORGE L. WALLIS
BY
Attorney

Patented May 18, 1954

2,678,633

UNITED STATES PATENT OFFICE 2,678,633

WRITING INSTRUMENT

Alfred T. Holden, London, and George L. Wallis, Tolworth, England, assignors to The Decca Record Company, Limited, London, England, a British corporation Application January 25, 1952, Serial No. 268,192

Claims priority, application Great Britain February 6, 1951

2 Claims. (Cl. 120—42)

This invention relates to writing instruments, and has particular reference to a stylus pen which finds particular utility when used with recording instruments of the type which write upon a chart as the result of relative motion between the chart and the stylus.

Certain types of recording instruments, such as electrical instruments, pressure gauges, navigational logging devices, and the like utilize a moving chart and stylus mechanism for producing a permanent record of the relative motion between the stylus and the chart, the chart being moved in one direction in accordance with variations in one variable, and the stylus being moved in a transverse direction in accordance with variations of another variable to draw on the chart a curve representing the function relating such two variables. In electrical instruments, pressure gauges, and the like the variations in pressure, voltage, etc. are usually plotted against time by using a clockwork to move the chart. In navigational plotters, the chart is moved in accordance with variations in one coordinate defining the geographical location of the vehicle carrying the instrument, while the stylus is moved in accordance with variations in the other geographical coordinate. The chart is usually printed as a map of the area to be traversed, so that the stylus will draw on the map a line representing the course or track of the vehicle.

Considerable difficulties have been encountered in the past in providing a suitable writing instrument capable of reliable and trouble-free operation. In general, the writing device must produce a clearly visible, legible, and permanent record, and various types of inks are most often used as the writing or marking medium. The device must be capable of operating unattended over long periods, must not flood or blot, and must be capable of being transported from place to place. All of the prior devices are to a certain extent deficient in one or more of these attributes.

The deficiencies of the prior devices become even more apparent when they are used on aircraft, because of the changes in attitude and the accompanying accelerations to which they are subjected, and because of the extreme variation in atmospheric pressure accompanying the rise and fall of the aircraft. Furthermore, most of the prior devices are difficult to read while in operation because the stylus and its mounting obscure the portion of the chart representing the then relation between the two variables plotted.

It is therefore an object of this invention to provide a writing instrument which may be used with recording devices of various kinds, and which overcomes the above-mentioned disadvantages.

It is also an object of this invention to provide a writing instrument of the character set forth in the preceding paragraph which includes a stylus mechanism connected to draw fluid ink from a reservoir from which the ink cannot escape.

It is an additional object of this invention to provide a writing instrument of the character set forth in the preceding paragraphs in which the reservoir comprises an elongated passage of sufficiently small dimension to retain the ink therein by reason of surface tension effects.

It is an additional object of this invention to provide a writing instrument of the character described wherein the ink reservoir comprises a passage wound helically about a body member which in turn supports the stylus mechanism.

It is also an object of this invention to provide a writing instrument of the character hereinabove described in which the ink reservoir passage is open at both ends to eliminate flooding resulting from changes in atmospheric pressure.

It is another object of this invention to provide a writing instrument utilizing a disk-like body formed of transparent material.

It is a still further object of this invention to provide a writing instrument of the character set forth in the preceding paragraph in which the transparent disk-like body is provided with at least one convex surface to define a magnifying lens affording a magnified view of the chart area disposed immediately beneath the body member.

Other objects and advantages of this invention will be apparent from a consideration of the following specification, read in connection with the accompanying drawings, wherein.

Figure 1:
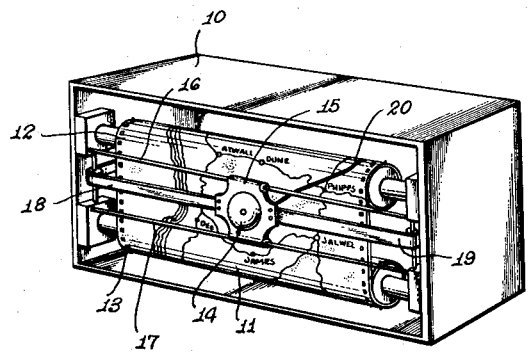
Fig. 1 is a perspective view illustrating a recording instrument of the navigational plotter type utilizing a writing instrument constructed in accordance with this invention.

Referring to the drawings, there is illustrated in Fig. 1 a recording instrument of the navigational plotter type utilizing as the writing device the writing instrument of this invention. The recording instrument may, for example, comprise a box or housing 10 for supporting and enclosing a chart 11. The chart 11 may be in the form of a long tape wound upon rollers 12 and 13. The portion of the chart passing between the rollers 12 and 13 passes beneath the writing instrument indicated generally at 14, which is mounted as by means of a carrier 15 upon guide rails 16 and 17 for movement transversely of the length of the chart 11, such movement of the writing instrument 14 being controlled as by endless bands 18 and 19.

In a navigational plotter, the chart 11 comprises a map of the area to be traversed, and through suitable drive mechanism connected to the rollers 12 and 13 the chart is caused to move lengthwise in accordance with variations in one of the geographical coordinates defining the position of the vehicle. At the same time, the writing instrument 14, through suitable drive mechanism cooperating with the flexible bands 18 and 19, is caused to move transversely of the chart in accordance with variations in the other geographical coordinate. In so moving, the writing instrument draws upon the chart a line such as the line 20 representing the course or track of the vehicle.

Figure 2:
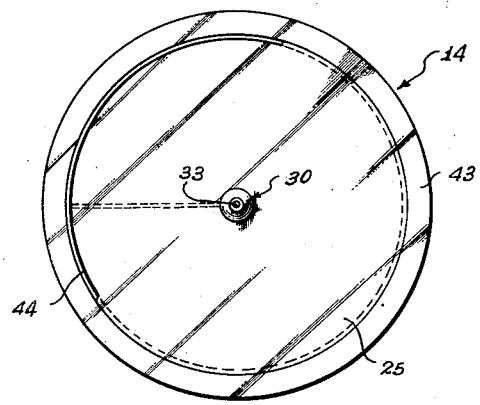
Fig. 2 is an enlarged underside view of the writing instrument.
Figure 3:
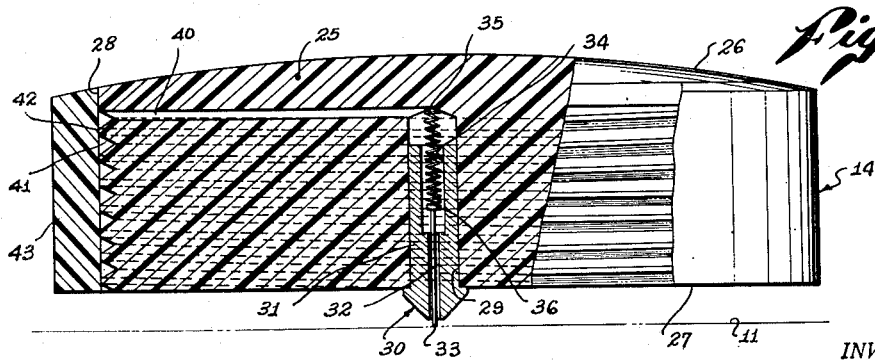
Fig. 3 is a central cross-sectional view to illustrate the details of construction.

As is best seen in Figs. 2 and 3, the writing instrument comprises a body member 25 of disklike form having upper and lower surfaces 26 and 27 and an outer cylindrical surface 28. In the center of the lower face 27 of the body 25 there is provided a blind bore 29 within which is mounted a stylus mechanism 30. The stylus mechanism 30 comprises a tubular bushing 31 pressed or otherwise firmly fitted into the blind bore 29 and having formed therein a small diameter ink feeding bore 32. A stylus member 33 comprising a small diameter wire or rod formed of a hard corrosion-resistant metal such as a gold alloy is loosely received within the bushing bore 32. The upper end of the bushing bore 32 is enlarged as shown at 34 to receive a light compression spring 35 which is interposed between the upper end of the blind bore 29 and a headed portion 36 of the upper end of the stylus 33. The spring 35 serves to maintain the outer end of the stylus 33 in engagement with the chart 11.

A laterally extending passageway 40 serves to connect the upper end of the blind bore 29 with an ink reservoir. According to this invention, the ink reservoir comprises a long passageway 41 of capillary size open at one end and connected at the other to the connecting passage 40. By reason of the surface tension effects attendant upon the use of a passageway of capillary dimensions, fluid ink will not escape from the passageway even though it is open-ended.

According to the preferred embodiment of this invention, the passageway 41 is formed by turning a screw thread on the outer cylindrical surface 28 of the body member 25 to provide an elongated helical groove encircling the body member. In turning the screw thread 41, a flat-topped thread form such as the United States or British standard V-thread is used so as to provide flat lands 42 between adjacent thread grooves and comprising an extension of the outer cylindrical surface 28.

The grooves 41 are closed to define the elongated passageway by means of an annular member 43 which is pressed over the outside of the body member 25 as shown in Fig. 3. The inner surface of the annular member 43 makes a sealing engagement with the outer cylindrical surface 28 and the lands 42.

It will be observed that the capillary passage so formed is connected at one end to the stylus mechanism 30, and is open at the other end to the atmosphere by reason of the thread groove running off the lower end of the body 25 as is indicated, for example, at 44 in Fig. 2. Because both ends of the ink-containing passageway are open to the atmosphere, the writing device of this invention is relatively insensitive to extreme changes in atmospheric pressure such as are encountered when the device is used on an aircraft. Furthermore, by reason of the capillary dimensions employed, the device may be operated in any position and will neither flood nor blot. Furthermore, the writing device is not subject to damage as an ordinary incident to being transported from one place to another.

In order that a user of the writing instrument may view that portion of the chart which is located immediately adjacent the stylus mechanism 30, it is preferred to form the body member 25 of a transparent material such as methyl methacrylate or similar transparent synthetic plastic material. If desired, one or both of the upper and lower surfaces 26 and 27 may be made convex so that the body member 25 constitutes a magnifying lens to afford an observer a magnified view of the chart area disposed immediately beneath the writing device.

It will be observed that the writing device of this invention is not only particularly adapted for use as a writing device on recording instruments and designed to meet the stringent requirements imposed by aircraft use, but by reason of the above-described features of construction, is susceptible to being manufactured readily and at low cost. The simple construction of the device insures long and trouble-free operation requiring little or no attention on the part of a user of the mechanism.

While the preferred embodiment of this invention has been shown and described, the same is not to be limited to the details of construction illustrated and described herein, except as defined in the appended claims.

We claim:

1. In an instrument for writing on a chart or the like, the combination of: a body member comprising a circular disk having a diameter exceeding its thickness and having an elongated passage of capillary size extending helically about the outer peripheral portion thereof for holding a supply of fluid ink; and a stylus mechanism carried by said body and extending axially from one face thereof to engage said chart upon placing said instrument adjacent said chart with the plane of said disk parallel to the surface of said chart, said stylus mechanism being connected to receive ink from one end of said passage, said body being formed of transparent material to permit observation of portions of said chart near said stylus mechanism by observation through the portion of said transparent body member which is encircled by said passage.

2. A writing instrument according to claim 1 wherein said disk includes at least one outwardly convex curved surface to constitute said disk a magnifying lens and thereby aid observation of said portions of said chart.

References Cited in the file of this patent

UNITED STATES PATENTS

| Number | Name | Date |
| --- | --- | --- |
| 402,415 | Dewey | Apr. 30, 1889 |
| 2,216,943 | Hanemann | Oct. 8, 1940 |
| 2,397,229 | Biro | Mar. 26, 1946 |
| 2,426,480 | Wood | Aug. 26, 1947 |
| 2,455,972 | Bowditch | Dec. 14, 1948 |